(12) United States Patent
Bakhoum

(10) Patent No.: US 9,614,953 B1
(45) Date of Patent: Apr. 4, 2017

(54) KEY FOB WITH NOVEL ELECTRO-MECHANICAL MEANS FOR KEY / PHONE LOCATOR APPLICATIONS

(71) Applicant: Ezzat G. Bakhoum, Milton, FL (US)

(72) Inventor: Ezzat G. Bakhoum, Milton, FL (US)

( * ) Notice: Subject to any disclaimer, the term of this patent is extended or adjusted under 35 U.S.C. 154(b) by 0 days.

(21) Appl. No.: 14/852,590

(22) Filed: Sep. 13, 2015

(51) Int. Cl.
| | |
|---|---|
| *G06F 1/16* | (2006.01) |
| *H05K 5/00* | (2006.01) |
| *H05K 7/00* | (2006.01) |
| *G08B 1/08* | (2006.01) |
| *H04W 24/00* | (2009.01) |
| *H04M 1/725* | (2006.01) |
| *H04W 4/00* | (2009.01) |
| *G06F 12/02* | (2006.01) |

(52) U.S. Cl.
CPC ...... *H04M 1/7253* (2013.01); *G06F 12/0246* (2013.01); *H04W 4/008* (2013.01); *G06F 2212/171* (2013.01); *H04M 2250/02* (2013.01)

(58) Field of Classification Search
CPC . G06F 1/16; G06F 1/18; H04L 67/18; H04W 64/00; H04W 4/008; H04W 4/02; H04W 4/20
USPC ............ 361/679.31, 679.32, 679.01, 679.02; 340/539.1, 539.13, 539.14, 539.15, 340/539.32; 455/456.1, 456.2, 456.3, 455/456.4, 456.5, 457, 456.6
See application file for complete search history.

(56) References Cited

U.S. PATENT DOCUMENTS

| | | | | |
|---|---|---|---|---|
| 6,674,364 B1 * | 1/2004 | Holbrook | ............... | G08B 21/24 340/539.32 |
| 6,774,787 B1 * | 8/2004 | Melbourne | ............ | G08B 21/24 340/539.1 |
| 7,230,533 B2 | 6/2007 | Hamolsky | | |
| 7,453,357 B2 * | 11/2008 | Bernal-Silva | .......... | G08B 13/14 340/539.32 |
| 8,253,559 B2 * | 8/2012 | Howard | ............. | G08B 13/1427 340/539.1 |
| 8,253,560 B2 * | 8/2012 | Howard | ............. | G08B 21/0247 340/539.1 |
| 8,254,958 B2 * | 8/2012 | Johnson | ................. | G08B 21/24 340/539.1 |
| 8,855,672 B1 | 10/2014 | Cohn et al. | | |

(Continued)

OTHER PUBLICATIONS

The TrackR device: https://www.thetrackr.com/bravo.
The GoKey device: https://www.indiegogo.com/projects/gokey-battery-memory-remote-all-on-your-keyring#/story.

*Primary Examiner* — Anthony Haughton

(57) ABSTRACT

The invention is a novel keychain attachment (or key fob) that will be useful for communicating with a smart phone via Bluetooth. These devices, which are currently available commercially, are used for locating the owner's keys by emitting an audible sound when the owner touches a button on his/her cell phone. Such a device can also be used for locating the owner's phone by conversely sending a signal that will make the phone emit an audible sound. Because those devices are typically small and must include a tactile button, it is not currently possible to manufacture such a device in the form of an ornamental figure, such as an animal, a cartoon character, etc. This invention introduces a novel electromechanical mechanism for activating the required wireless functions in the key fob, while allowing the device to be manufactured in the shape of an attractive ornamental figure.

11 Claims, 3 Drawing Sheets

(56) References Cited

U.S. PATENT DOCUMENTS

| | | | |
|---|---|---|---|
| 8,983,537 B2* | 3/2015 | Johnson | G08B 21/24 340/539.1 |
| 2003/0011478 A1* | 1/2003 | Rabanne | G01S 19/17 340/573.4 |
| 2008/0304225 A1* | 12/2008 | Regen | H01R 13/6641 361/679.31 |
| 2011/0304971 A1* | 12/2011 | Kelley | H05K 5/0278 361/679.31 |
| 2014/0256351 A1* | 9/2014 | Howard | G08B 13/1427 455/456.1 |
| 2014/0334089 A1* | 11/2014 | Schade | G06F 1/183 361/679.32 |

* cited by examiner

KEY FOB WITH NOVEL ELECTRO-MECHANICAL MEANS FOR KEY / PHONE LOCATOR APPLICATIONS

SUMMARY OF THE INVENTION

The invention is a novel keychain attachment (or key fob) that will be useful for communicating with a smart phone via Bluetooth. These devices, which are currently available commercially, are used for locating the owner's keys by emitting an audible sound when the owner touches a button on his/her cell phone. Such a device can also be used for locating the owner's phone by conversely sending a signal that will make the phone emit an audible sound. Because those devices are typically small and must include a tactile button, it is not currently possible to manufacture such a device in the form of an ornamental figure, such as an animal, a cartoon character, etc. This invention introduces a novel electromechanical mechanism for activating the required wireless functions in the key fob, while allowing the device to be manufactured in the shape of an attractive ornamental figure.

DETAILED DESCRIPTION OF THE INVENTION, AND PREFERRED EMBODIMENTS THEREOF

An electronic device that is currently available commercially in the form of an attachment to a keychain (e.g. a key fob) is used for the purpose of communicating via Bluetooth with a smart phone. This device, which is available from a number of manufacturers, typically includes an audible alarm for assisting the owner in locating his/her keys. If the owner presses a button on the smart phone, the device beeps. The device can also assist the owner in locating his/her smart phone by performing the opposite function: if the owner presses a button in the device, the smart phone beeps. Such devices can also be used with smart tablets if so desired.

It will be very desirable to offer the mentioned device commercially in the form of an ornamental figure, such as an animal, a cartoon character, etc. Unfortunately, it is difficult to manufacture such a device as a plastic part in the form of an animal or other ornamental figure because of the necessity of incorporating a button in the device to help the user locate his/her smart phone. Indeed, commercially available devices such as the "TrackR", the "GoKey", etc., come in the shape of a simple plastic circle because of the necessity of incorporating a tactile button in the device. It is the purpose of the present invention to offer a method for incorporating a tactile button in an electronic key fob, while allowing such a key fob to be manufactured in any desired shape. The concept of the invention is novel and there is no restriction on the shape or the aesthetic features of the device, as the drawings and the ensuing disclosure will show.

Figure 1:
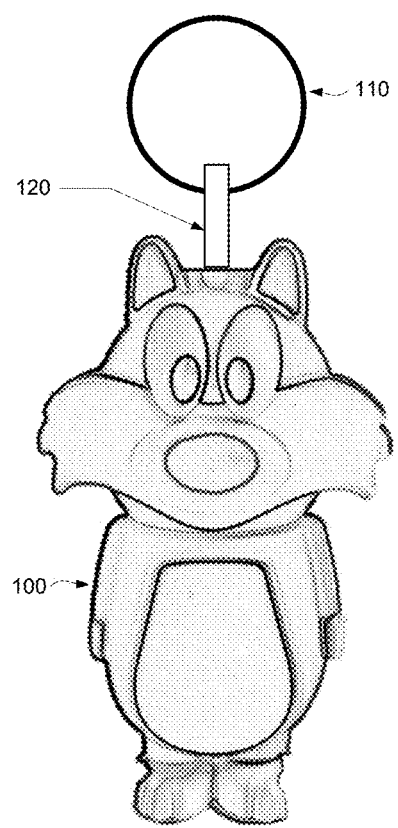
FIG. 1 is a sketch of the preferred embodiment of the present invention. The figure shows a key fob in the form of an ornamental figure, attached to a key ring by means of an electromechanical actuator.
Figure 2:
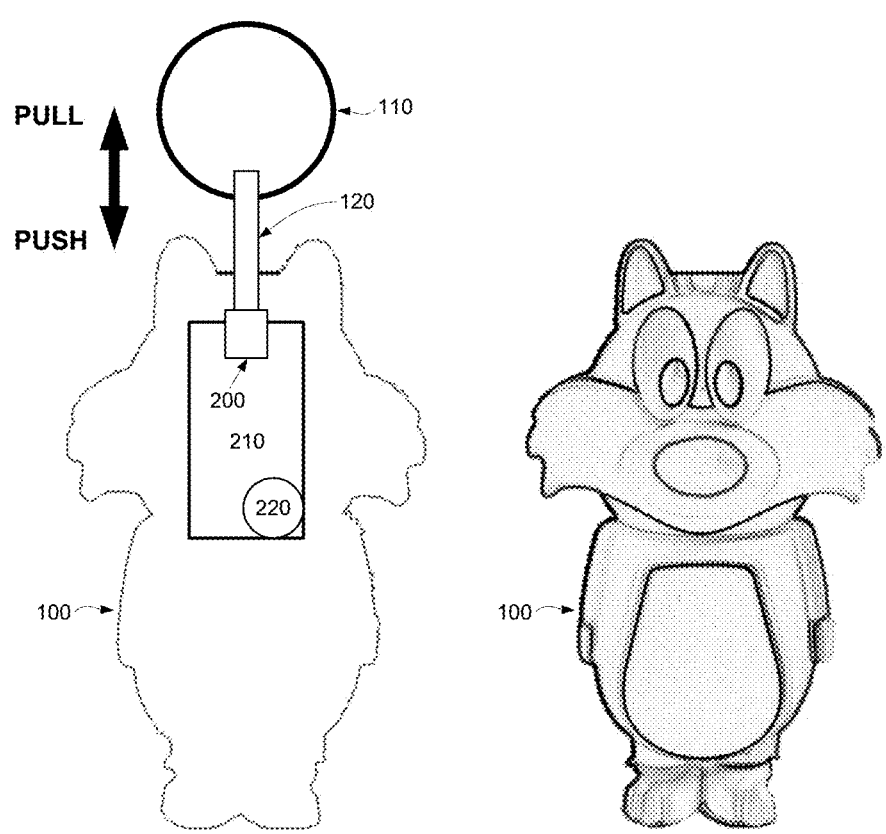
FIG. 2 shows a cross-sectional cut through the device of FIG. 1. The electromechanical actuator, as the figure reveals, is attached to a circuit board inside the device that performs various functions, including wireless communications.

Reference is now made to the drawings. FIG. 1 shows a key fob 100 that could be in the shape of an animal, a cartoon character, etc. The device is attached to a key ring 110 by means of a metal or a plastic bar 120. FIG. 2 shows a cross-sectional cut through the device 100 that reveals its internal features. The metal or plastic bar 120 is the most important element in the present invention. It serves as an actuator for essentially performing the same function as a push-button. As the figure shows, the actuator can be pushed (or pulled) to close a switch 200 that is soldered to a circuit board 210. The circuit board 210 would then respond to the closure of the switch by sending a Bluetooth signal to a nearby smart phone. The circuit board 210 would be typically powered by a battery 220. As stated previously, the circuit board 210 would also include an audible buzzer or other sound generation mechanism.

It should be therefore clear from the above description that the main feature of the present invention is that the attachment mechanism of the key fob is the same as the actuation mechanism that is used for transmitting a wireless signal. Such a feature is not shown in the prior art.

Figure 3:
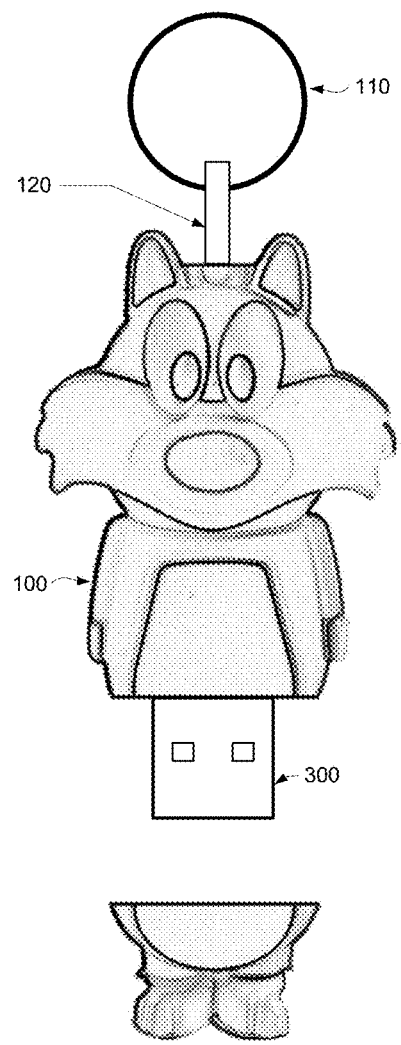
FIG. 3 is an expansion of the preferred embodiment of FIG. 1, further revealing a USB flash drive that can be embedded inside the device.

FIG. 3 shows a more preferred embodiment of the present invention, where the key fob 100 further includes a USB flash drive 300 that provides memory storage. The lower portion of the device can be removed, as shown in the figure, to reveal the USB drive. This technique and feature is currently known in the prior art. The connector for the USB flash drive can be either a full-size connector or a Mini/Micro USB connector.

While the invention has been described hereinabove with reference to specific features and embodiments, it will be recognized by those skilled in the art that several variations are possible, and the invention is intended to encompass all possible variations and alternatives within its scope.

What is claimed is:

1. An electronic device, comprising:
   a) an ornamental figure;
   b) wireless connectivity means within said ornamental figure for receiving a signal transmitted by a smart phone or tablet and activating an audible response in said device, and conversely for transmitting a signal that activates an audible response in said smart phone or tablet;
   c) electromechanical means within said ornamental figure for initiating the transmission of said signal to said smart phone or tablet;
   said electromechanical means is activated by pushing or pulling a rigid actuator that is protruding from said ornamental figure; and
   d) means for attaching said rigid actuator directly to an external object or structure.

2. A device according to claim 1, constructed and arranged as a keychain or keychain attachment.

3. A device according to claim 1, wherein said audible response is generated by a component for generating audible sound.

4. A device according to claim 1, wherein said wireless connectivity means utilizes a common short-distance communication protocol.

5. A device according to claim 1, wherein said wireless connectivity means is used for locating the device.

6. A device according to claim 1, wherein said wireless connectivity means is used for locating the owner's phone or tablet.

7. A device according to claim 1, wherein said rigid actuator is a metal rod.

8. A device according to claim 1, wherein said rigid actuator is a plastic rod.

9. A device according to claim 1, wherein said ornamental figure is chosen from the group consisting of animal figures and cartoon characters.

10. A device according to claim 1, wherein said ornamental figure is made of plastic.

11. A device according to claim 1, further including flash memory that is provided through a USB interface.

* * * * *